US012683856B2

(12) United States Patent
Balasubramanian et al.

(10) Patent No.: US 12,683,856 B2
(45) Date of Patent: **\*Jul. 14, 2026**

(54) OPTIC POWER MONITORING SYSTEM

(71) Applicant: CITIBANK, N.A., New York, NY (US)

(72) Inventors: Raja Balasubramanian, Skillman, NJ (US); Rene Wilfredo Villatoro Escalante, Irving, TX (US); Chike Gideon Okechukwu, Denton, TX (US); Terry John Jenkins, Irving, TX (US); Scott Taylor, Keller, TX (US)

(73) Assignee: Citibank, N.A., New York, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 18/615,364

(22) Filed: Mar. 25, 2024

(65) Prior Publication Data

US 2025/0168060 A1 May 22, 2025

Related U.S. Application Data

(63) Continuation of application No. 18/376,051, filed on Oct. 3, 2023, now Pat. No. 11,943,096.

(51) Int. Cl.
*H04L 41/069* (2022.01)
*H04B 10/03* (2013.01)
(Continued)

(52) U.S. Cl.
CPC ........... *H04L 41/069* (2013.01); *H04B 10/03* (2013.01); *H04B 10/07955* (2013.01); *H04L 41/22* (2013.01)

(58) Field of Classification Search
CPC ....... H04L 41/069; H04L 41/22; H04B 10/03; H04B 10/07955; H04B 10/0793; H04B 10/0791
See application file for complete search history.

(56) References Cited

U.S. PATENT DOCUMENTS 10,367,699 B2 7/2019 Jin
11,943,096 B1 3/2024 Balasubramanian et al.
(Continued)

FOREIGN PATENT DOCUMENTS

CN 113904719 B * 3/2022 ....... H04B 10/07955
CN 116614177 A 8/2023
CN 118631331 A 9/2024

OTHER PUBLICATIONS

Office Action for U.S. Appl. No. 18/376,051, Nov. 24, 2023, 11 pages.
(Continued)

*Primary Examiner* — Ahmed A Berhan
(74) *Attorney, Agent, or Firm* — Perkins Coie LLP

(57) ABSTRACT
The technology may be utilized in network environments that use fiber optic cables to connect components. Components of the network perform functions as transceivers that transmit and receive light signals via the fiber cable. When optic power data received from the transceivers is recognized as a fault, an event is identified. The system logs each received event and converts all measurements into a common unit of measurement. The system analyzes aggregated data from the transceivers to detect patterns and trends, monitor the received data and provide real time fault predictions. For example, a machine learning process may recognize subtle trends or patterns in the data, and use the
(Continued)

recognition to predict potential failures. The system uses the received data to create a graphical user interface ("GUI") that represents the health of the network.

19 Claims, 10 Drawing Sheets

(51) Int. Cl.
  *H04B 10/079*     (2013.01)
  *H04L 41/22*      (2022.01)

(56)                References Cited

U.S. PATENT DOCUMENTS

| | | | |
|---|---|---|---|
| 12,028,108 | B1 | 7/2024 | Mostavi et al. |
| 12,334,974 | B1 | 6/2025 | Balasubramanian et al. |
| 2012/0263457 | A1 | 10/2012 | Mahlab et al. |
| 2014/0003804 | A1* | 1/2014 | Fargano ............. H04B 10/0791 398/13 |
| 2014/0055776 | A1 | 2/2014 | Hathorn et al. |
| 2017/0310562 | A1* | 10/2017 | Jin ......................... H04L 41/16 |
| 2018/0248905 | A1 | 8/2018 | Côté et al. |
| 2019/0072319 | A1* | 3/2019 | Laible ................... F25D 23/126 |
| 2019/0245620 | A1 | 8/2019 | Rafique et al. |
| 2020/0153504 | A1 | 5/2020 | Tanimura et al. |
| 2021/0240683 | A1 | 8/2021 | Mccain et al. |
| 2022/0294529 | A1* | 9/2022 | Janulewicz ........ H04B 10/0795 |
| 2023/0367669 | A1 | 11/2023 | Tiwari et al. |
| 2024/0214066 | A1 | 6/2024 | Kobayashi et al. |

OTHER PUBLICATIONS

Zhilong Wang, et al., "Failure Prediction Using Machine Learning and Time Series in Optical Network," Optics Express, Aug. 7, 2017, pp. 18553-18565, vol. 25, Issue No. 16, Optica Publishing Group, https://opg.optica.org.oe/fulltext.cfm?uri=oe-25-16-18553&id=370117.

International Search Report and Written Opinion issued in corresponding International Application No. PCT/US2024/021309 on Jun. 21, 2024 (17 pages).

Notice of Allowance mailed Apr. 14, 2025, in U.S. Appl. No. 18/977,029.

Wang et al, A Review of Machine Learning-Based Failure Management in Optical Networks, 2022, Information Sciences; pp. 1-19. (Year: 2022).

Zhang et al; Attention Mechanism-Driven Potential Fault Cause Identification in Optical Networks; 2021; Optical society of America; pp. 1-3. (Year: 2021).

Zhao et al; Accurate Fault Location based on Deep Neural Evolution Network in Optical Networks for 5G and Beyond, 2019; Optical Society of America; pp. 1-3. (Year: 2019).

Partial International Search Report issued Mar. 2, 2026, in International Application No. PCT/US2025/057731 (14 pages).

* cited by examiner

100

200

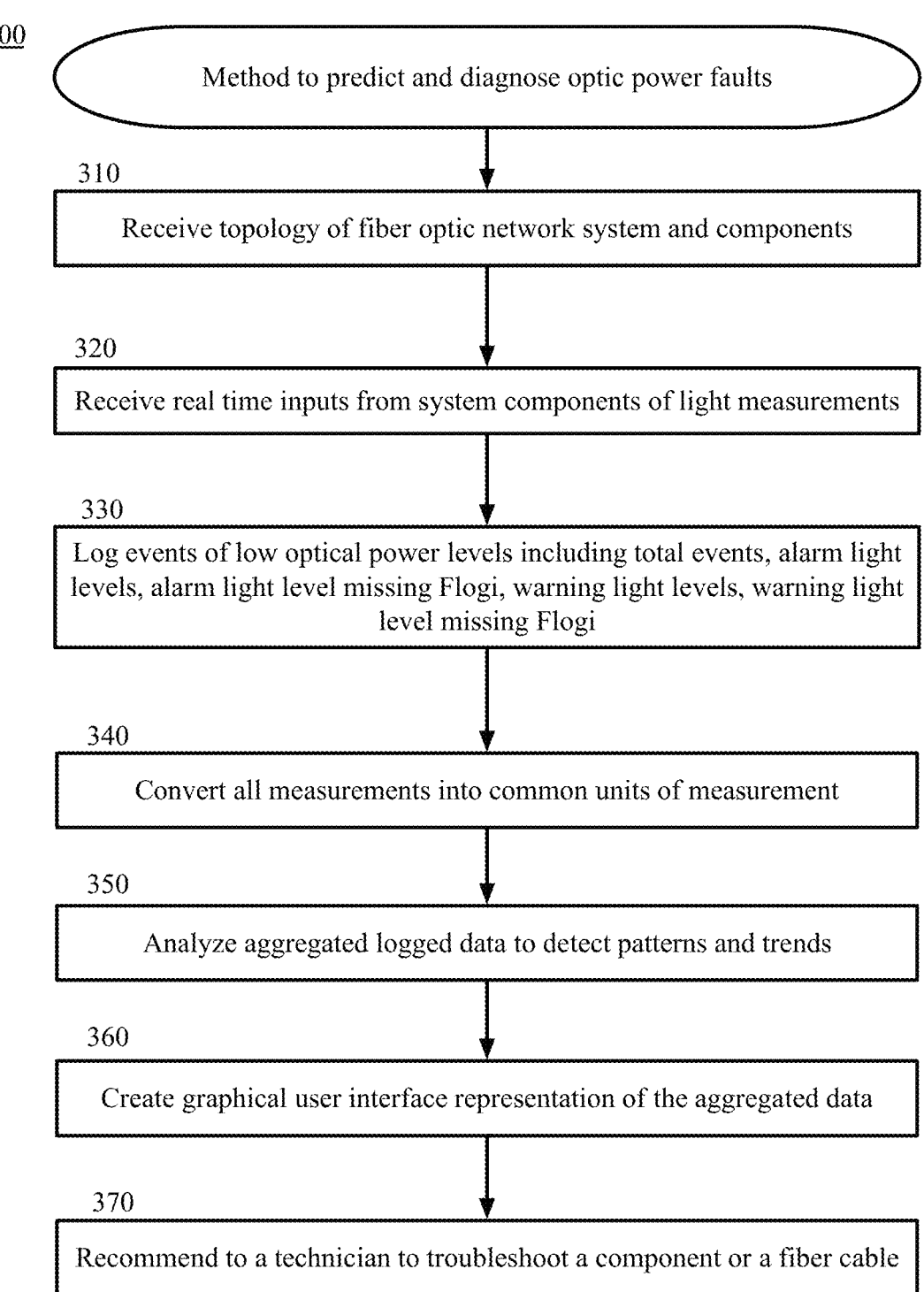

300

Method to predict and diagnose optic power faults

310
Receive topology of fiber optic network system and components

320
Receive real time inputs from system components of light measurements

330
Log events of low optical power levels including total events, alarm light levels, alarm light level missing Flogi, warning light levels, warning light level missing Flogi 340
Convert all measurements into common units of measurement 350
Analyze aggregated logged data to detect patterns and trends 360
Create graphical user interface representation of the aggregated data 370
Recommend to a technician to troubleshoot a component or a fiber cable

OPTIC POWER MONITORING SYSTEM

CROSS REFERENCE TO RELATED APPLICATIONS

This application claims the benefit of priority to and is a continuation of co-pending U.S. patent application Ser. No. 18/376,051 filed Oct. 3, 2023, entitled "Optic Power Monitoring System," the entire contents of which are hereby expressly incorporated herein by this reference including, without limitation, the specification, claims, and abstract, as well as any figures, tables, or drawings thereof.

FIELD OF THE INVENTION

The technology relates generally to the field of optic power monitoring, and more particularly to providing real-time detection and solution recommendations for optic power level faults in a Storage Area Network ("SAN") environment.

BACKGROUND OF THE INVENTION

Optic fiber refers to the technology and science that uses glass or plastic threads ("fiber") to transmit data as light signals over long distances. The fiber cable provides high speed and high bandwidth communication. For example, in a Storage Area Network ("SAN") environment, fiber cables are often used to transmit data at high speed. In conventional systems, the transmission rates may be 64 Gbps or 128 Gbps.

SAN systems provide fast, reliable, and centralized access to data storage, which improves data storage utilization and enables efficient data management. However, performance of the devices connected to the SAN infrastructure may be negatively impacted because of low light or low optical power levels. Conventional systems do not have an efficient and thorough process to measure and monitor the optical power levels.

Without proper monitoring, system issues may include flapping ports, increased latency, signal attenuation, bit errors, signal distortion, and other faults or issues. For example, port flapping in conventional SAN systems is a condition where the port state changes rapidly and repeatedly. This issue is usually caused by problems with the underlying network infrastructure, such as cable faults, power issues, or other hardware failures. Port flapping causes network links to connect and disconnect frequently. This change in the state of links causes a network topology change. These accumulated issues can result in lost connectivity, data transfer errors, and disruptions to the storage environment. These results impact the availability and performance of the storage resources. Frequent topology changes complicate the flow of network traffic and may eventually lead to a network shutdown. Such issues lead to degraded performance of the server components. Other similar faults may be caused by changes or variations in the optic power levels transmitted along the fiber cables.

The performance of applications hosted or executed on the SAN system is associated with the performance of the SAN components, which in turn can be affected by the optical power levels. Thus, when the optical power levels are monitored and managed properly, applications or other functions of these systems are able to operate more efficiently.

BRIEF DESCRIPTION OF THE DRAWINGS

An understanding of the features and advantages of the present invention will be obtained by reference to the following detailed description that sets forth illustrative embodiments, in which the principles of the invention may be utilized, and the accompanying drawings of which:

FIG. 3 is a block flow diagram depicting a method to predict and diagnose optic power faults.

FIG. 7 is an example graphical user interface depicting system servers.

Figure 1:
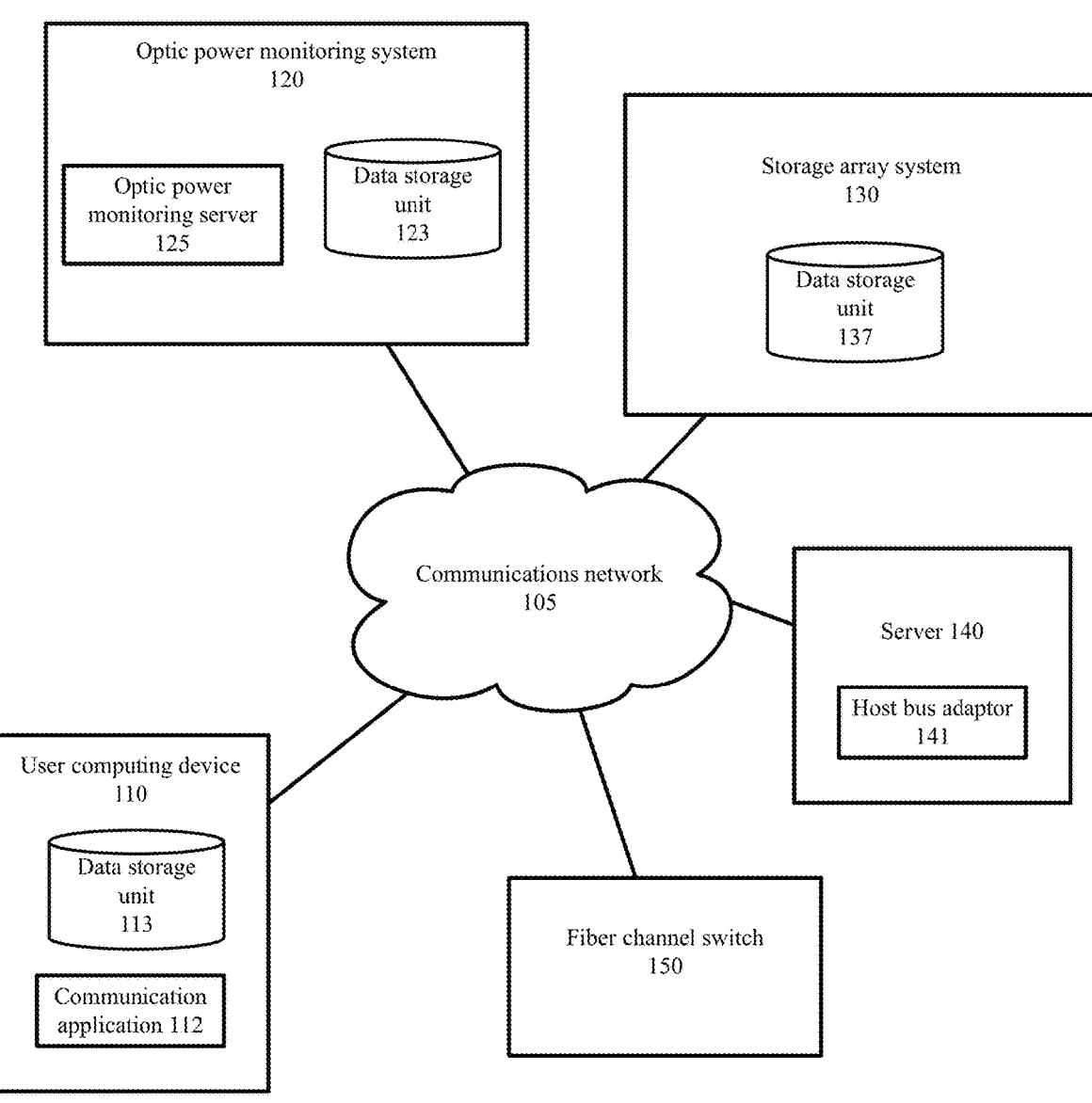
FIG. 1 is a block diagram depicting a portion of a communications and processing architecture of a typical system to provide optic power level monitoring.

The figures herein are for illustrative purposes only and are not necessarily drawn to scale. These and other aspects, objects, features, and advantages of the example embodiments will become apparent to those having ordinary skill in the art upon consideration of the following detailed description of example embodiments.

OVERVIEW

The technology may be utilized in environments such as a SAN environment that includes fiber channel switches, host bus adapters, storage arrays, and fiber channel cable used to connect the components. Components of the network perform functions as transceivers that transmit and receive light signals via the fiber cable. Each transceiver has sensors to measure the light received via the cable. The system receives data from the transceivers related to the light measurements received. The system stores the received data. When data is recognized as a fault, failure, or other disruption in the normal communication process, an event is identified. The system logs each received event, such as alarm light levels, alarm light level missing FLOGI, warning light levels warning light level missing FLOGI, or other events.

The system converts all measurements into a common unit of measurement so that all data sources may be compared and analyzed. The system analyzes aggregated data from all of the transceivers to detect patterns and trends. For example, the system may use a series of algorithms, thresholds, or data management software applications to determine when a fiber cable, a transceiver, or other system component is in danger of developing a fault. For example, the algorithm may recognize that a light level is flapping or fluctuating. The algorithm may recognize that the flapping is increasing in frequency or magnitude and determine that the flapping is likely to result in a fault. Any other determination may be made from the analyzed data.

In another example, data may be fed as inputs into a machine learning process to monitor the received data and provide real time fault predictions. For example, the machine learning process may recognize subtle trends or patterns in the data, and use that recognition to predict potential failures.

The system uses the received data to create a graphical user interface ("GUI") that represents the health of the network. The GUI may present data, such as a number of events for each type of fault or other event. The GUI may be color coded to provide an overview of the system that allows a user to instantly recognize a current or potential fault. The overall health of the network may be captured in an overview visual of the system. When faults or potential faults are recognized, a user or technician may be directed to make repairs or changes to the network.

In conventional systems, a light measurement tool requires a technician to tap into a fiber cable to intercept light signals. To get an accurate optic power level reading, the external tool must disrupt the signal. The improved method is non-intrusive and is less disruptive to the network. Further, this non-intrusive approach costs less in labor and equipment than conventional systems.

This invention represents an advance in computer engineering and a substantial advancement over existing practices. The monitoring of the power levels allows faults to be detected in real time to prevent downtime. Further, the analysis of the aggregated data allows the system to predict potential faults to allow repairs or adjustment to the system to prevent faults before they are realized. This method and system provides a non-conventional, technical, real-world output and benefit that is not obtainable with conventional systems. All computing devices on the system operate more efficiently and with greater usage time when the optic power levels are measured and monitored. Humans could not perform the processes described herein because the amount of data received in real time from every device in a network could not be processed in the mind. Further, the analysis of the data is performed by algorithm, such as a machine learning algorithm, and the subtle inferences that identify potential faults are not performable in a human mind.

Example System Architectures

Turning now to the drawings, in which like numerals represent like (but not necessarily identical) elements throughout the figures, example embodiments are described in detail.

FIG. 1 is a block diagram depicting a system 100 to provide optic power level monitoring. A user associated with a user computing device 110 installs an application, or makes a feature selection to obtain the benefits of the techniques described herein.

As depicted in FIG. 1, the system 100 includes network computing devices/systems 110, 120, 130, 140, and 150 that are configured to communicate with one another via one or more networks 105 or via any suitable communication technology.

Each network 105 includes a wired or wireless telecommunication means by which network devices/systems (including devices 110, 120, 130, 140, and 150) can exchange data, such as a fiber optic cable network. For example, each network 105 can include any of those described herein such as the network 2080 described in FIG. 9 or any combination thereof or any other appropriate architecture or system that facilitates the communication of signals and data. Throughout the discussion of example embodiments, the terms "data" and "information" are used interchangeably herein to refer to text, images, audio, video, or any other form of information that can exist in a computer-based environment. The communication technology utilized by the devices/systems 110, 120, 130, 140, and 150 may be similar networks to network 105 or an alternative communication technology.

Each network computing device/system 110, 120, 130, 140, and 150 includes a computing device having a communication module capable of transmitting and receiving data over the network 105 or a similar network. For example, each network device/system 110, 120, 130, 140, and 150 can include any computing machine 2000 described herein and found in FIG. 9 or any other wired or wireless, processor-driven device. In the example embodiment depicted in FIG. 1, the network devices/systems 110, 120, 130, 140, and 150 are operated by users, optic power monitoring system operators, storage array operators, server operators, and/or fiber channel switch operators, respectively.

The user computing device 110 can use the communication application 112, which may be, for example, a web browser, application, or a stand-alone module, to view, download, upload, or otherwise access documents or web pages through a user interface via the network 105. The user computing device 110 can interact with the web servers or other computing devices connected to the network 105, including the optic power monitoring system 120 or any other component of the network 105. In another example embodiment, the user computing device 110 communicates with devices in the network 105 via any other suitable technology, including the example computing system described below. In an example, the communication application 112 is an application for receiving analyzed data from the optic power monitoring system 120, such as a recommendation to repair a network fault. For example, the communication application 112 may be used to review faults, display graphical user interfaces, communicate with the optic power monitoring system 120, interrogate the server 140, or perform any other suitable tasks.

The user computing device 110 also includes a data storage unit 113 accessible by the communication application 112, or other applications. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In another example embodiments, the data storage unit 113 may reside in a cloud-based computing system.

An example optic power monitoring system 120 comprises a data storage unit 123 and an optic power monitoring server 125. The data storage unit 123 can include any local or remote data storage structure accessible to the optic power monitoring system 120 suitable for storing information. The data storage unit 123 can include one or more tangible computer-readable storage devices, or the data storage unit 123 may be a separate system, such as a different physical or virtual machine or a cloud-based storage service.

In one aspect, the optic power monitoring server 125 performs any of the processing or communication functions associated with the optic power monitoring system 120 described herein. For example, the optic power monitoring server 125 communicates with the user computing device 110, the server 140, the fiber channel switch 150, the storage array system 130 and/or any other computing system to acquire data or to transmit requested data. The data may include any suitable data used for any purposes described herein, such as detecting fraud or training a machine learning algorithm.

The optic power monitoring server 125 may perform the functions described herein, such as to collect, log, aggregate, and analyze data received from the other components. The optic power monitoring server 125 may perform the analysis using rules, algorithms, software functions, machine learning, artificial intelligence, or any other suitable process to analyze the data.

A storage array system 130 may include a data storage unit 137. The storage array system 130 sends and receives data from the server 140, the fiber channel switch 150, or any other component or device via a fiber cable. The fiber cable may transmit light optically via the fiber cable to or from the storage array system 130 delivering packets or streams of data. The storage array system 130 communicates with the user computing device 110 and/or the optic power monitoring system 120 to request and receive data. The data may comprise measurements or other characteristics of the light signal received or transmitted along the fiber cable as described herein.

The data storage unit 137 can include any local or remote data storage structure accessible to the fraud system 130 suitable for storing information. The data storage unit 137 can include one or more tangible computer-readable storage devices, or the data storage unit 137 may be a separate system, such as a different physical or virtual machine or a cloud-based storage service.

The server 140 may be any device that performs functions for the network system to respond to user interactions. For example, the server 140 may be a "host" for applications or other functions accessed by users or customers. The server 140 may perform other functions of the network system, such as managing data flows, interacting with operators, receiving inputs of data from third parties, or performing any other suitable functions.

The server 140 utilizes host bus adaptors 141. The host bus adaptor 141 may be a circuit board or other type of hardware or software that connects a host system, such as server 140, to a network 105 or to any components of the network 105. A host bus adaptor 141 also provides input/output processing to reduce the load on the microprocessor of the server 140 when storing and retrieving data.

The fiber channel switch 150 allows the creation of a fiber channel fabric, a core component of the SAN system. The fabric is a network of fiber channel components that allow for communications along the network. The fiber channel switch 150 are used to connect storage array systems 130 to servers 140 or other components. This connection provides point-to-point, switched and loop interfaces to deliver in-order and lossless raw block data.

It will be appreciated that the network connections shown are examples, and other means of establishing a communications link between the computers and devices can be used. Moreover, those having ordinary skill in the art having the benefit of the present disclosure will appreciate that the user computing device 110, optic power monitoring system 120, the storage array system 130, the server 140, and the fiber channel switch 150 illustrated in FIG. 1 can have any of several other suitable computer system configurations. For example, a user computing device 110 embodied as a mobile phone or handheld computer may not include all the components described above.

Figure 2:
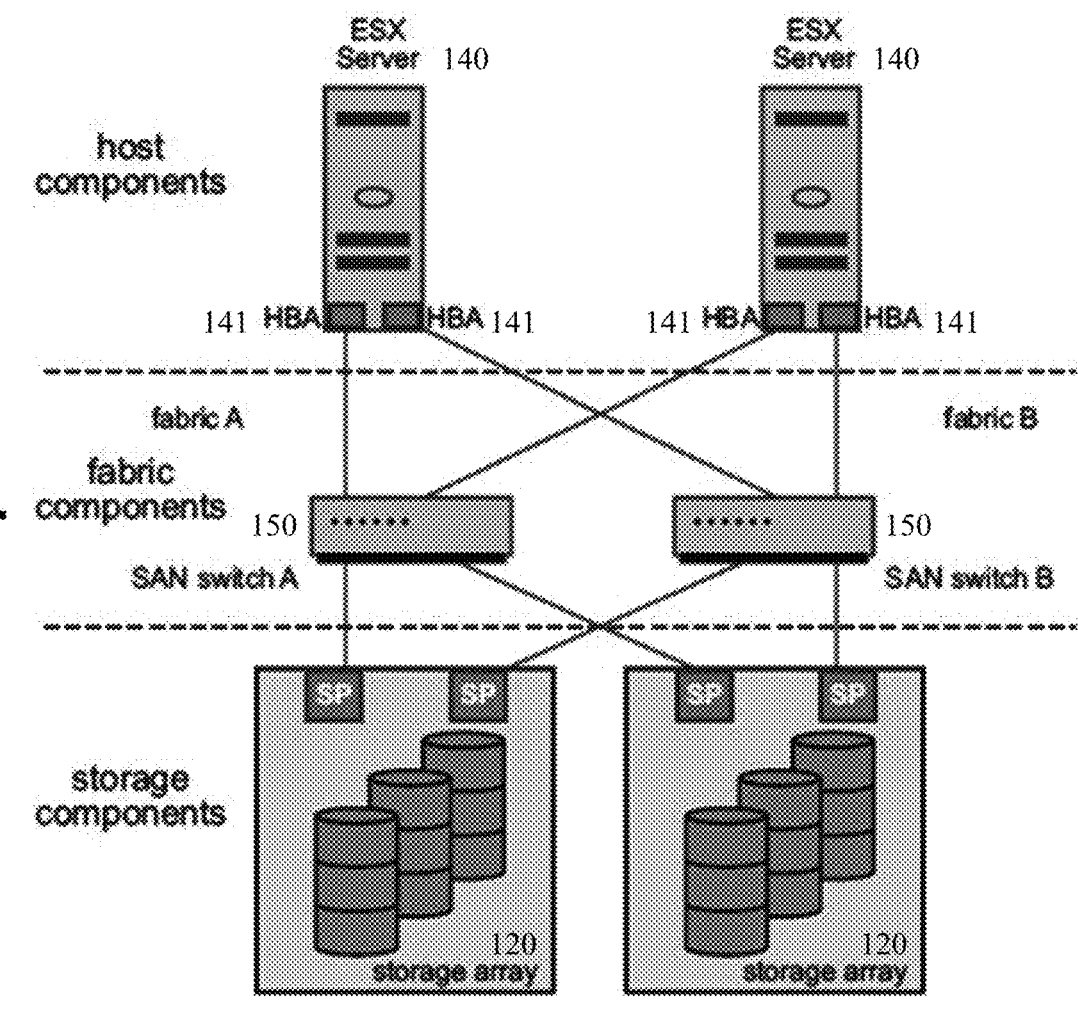
FIG. 2 is a block diagram depicting an example SAN system using fiber cable communications.

FIG. 2 is a block diagram depicting an example SAN system using fiber cable communications. This example SAN system illustrates the connections of a fiber cable system between servers 140, a fiber channel switches 150, and storage arrays 120. The interconnecting lines represent fiber cables between the components of the SAN system. For example, the SAN switch A 150 is connected to both storage arrays 120 and both ESX servers 140 by fiber cables. The switch is thus able to create a fabric A that allows communications to flow from or to any of the components.

Figure 9:
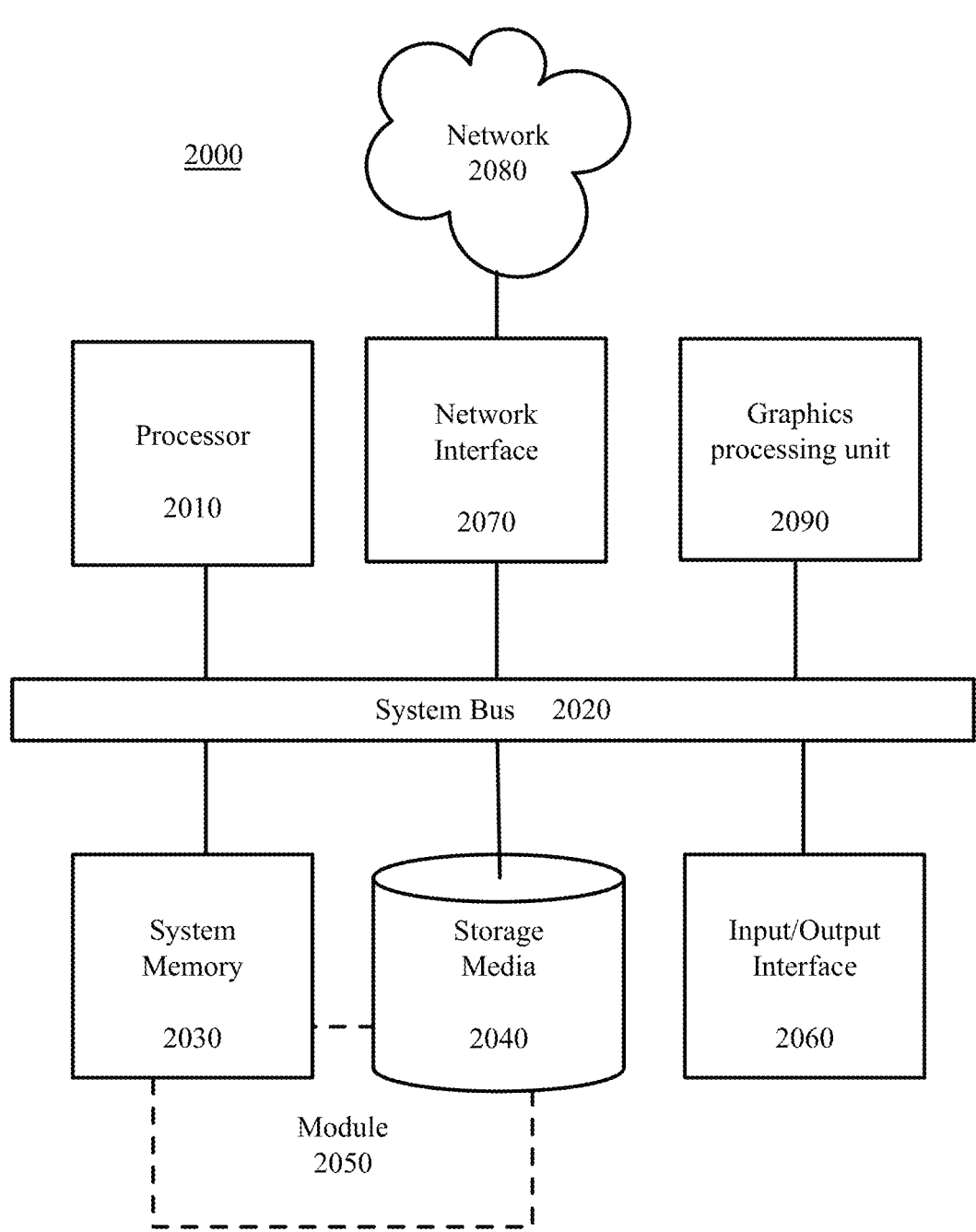
FIG. 9 is a block diagram depicting a computing machine and modules.

In example embodiments, the network computing devices and any other computing machines associated with the technology presented herein may be any type of computing machine such as, but not limited to, those discussed in more detail with respect to FIG. 9. Furthermore, any modules associated with any of these computing machines, such as modules described herein or any other modules (scripts, web content, software, firmware, or hardware) associated with the technology presented herein may by any of the modules discussed in more detail with respect to FIG. 9. The computing machines discussed herein may communicate with one another as well as other computer machines or communication systems over one or more networks, such as network 105. The network 105 may include any type of data or communications network, including any of the network technology discussed with respect to FIG. 9.

EXAMPLE PROCESSES

The example methods illustrated in FIG. 3 are described hereinafter with respect to the components of the example architecture 100. The example methods also can be performed with other systems and in other architectures including similar elements.

Referring to FIG. 3, and continuing to refer to FIG. 1 for context, a block flow diagram illustrates methods 300 to predict and diagnose optic power faults, in accordance with certain examples of the technology disclosed herein.

In block 310, the optic power monitoring system 120 receives a topology of a fiber optic network system and the components of the system. The topology may include the locations of each component, the connections between components, the functions of each component, the model numbers and manufacturers of each component, the types of communication technologies between each component, and any other suitable data. The components may include components described herein, such as an optic power monitoring system 120, a storage array system 130, a server 140, and a fiber channel switch 150, or any other suitable components of a network system 105. The functions of the optic power monitoring system 120 may be performed by an optic power monitoring server 125 that is part of the optic power monitoring system 120.

The optic power monitoring system 120 may monitor communications or other interactions between the components to determine how the components are connected. The optic power monitoring system 120 may receive inputs from an operator that describe or illustrate the topology of the system. Any other process or method may be used to receive the topology.

In block 320, the optic power monitoring system 120 receives real time inputs from system components of light measurements in the fiber cables. Each component, such as server 140, may have measurement devices or tools that monitor the power or level of light received over an input fiber cable. The fiber cable delivers data to the component via light sources transmitted over the fiber cable. In an example, when the level of light is low, the component may not be able to interpret the data. The measurement device on the component may be provided by the manufacturer of the component as an onboard function of the component. In other examples, the measurement device may be a separate tool that is attached to the component by the manufacturer or by an operator of the network 105.

The measurements from the components may include any related data, such as real time optic power levels, historical optic power levels, device types, units of measurement, device serial numbers, fiber cable types, fiber signal sources, or any other suitable data.

The optic power levels may vary based on multiple factors. In certain examples, the optic power level may vary naturally based on the source of the signal. In other examples, problems or faults in the optic cable or other components of the network 105 may cause the optic power levels to vary or disappear. For example, the optic power level may be affected by distance. That is, the farther the signal travels, the more the signal may degrade, and the lower the power level at the receiving end of the fiber cable. In another example, splices and connectors can cause signal loss, especially if the splices and connectors are not professionally installed or maintained. In another example, bending of a fiber optic cable too tightly can cause the signal to weaken, which can lead to low power levels. In another example, dust and dirt can accumulate on the connector end faces, causing attenuation and reflection. In another example, a connector, such as a GBIC or transceiver on the end of the fiber optic cable, can become dirty or damaged, which can cause signal loss and low power levels. In another example, extreme temperatures can cause the fiber to expand or contract, causing signal loss and low power levels. In another example, the fiber cable may degrade over time, causing signal loss and low power levels. Any other condition may cause a weakening or loss of the optic power level of a signal.

When the optic power monitoring system 120 receives the real time inputs from the components, the data may be in any suitable format or unit of measurement. For example, data from one component may be provided in one data packet format that is standard for the manufacturer of that component while another component provides data in a different data packet format. For example, one data packet may be provided in CSV format, while another is provided with a JSON format. The inputs may be received continuously, periodically, or at regular intervals. The inputs may be a reading of the optic power level entering or leaving the component along the fiber cable. An alarm signal generated by the component that recognizes a fault may also be communicated in the data packet.

In one example, the data is received from a host bus adaptor, such as the host bus adaptor 141 that is illustrated in association with the server 140. In certain examples of the technology, the host bus adaptor 141 does not provide optic power levels, but only distributed components of the network 105, such as the storage array system 130 and the fiber channel switches 150.

In block 330, the optic power monitoring system 120 logs events of low optical power levels including total events, alarm light levels, alarm light level missing Fabric Login ("Flogi"), warning light levels, or warning light level missing Flogi. Any other suitable events may be recorded, such as any event that indicates a loss or pending loss or interruption of the signal.

The optic power monitoring system 120 may recognize the events or the events may be flagged by the component providing the data. For example, the component may include a notification that an event has occurred or is occurring, and the event is represented in the data. In another example, the optic power monitoring system 120 recognizes the event, such as a reading of optic power level below a configured threshold.

In block 340, the optic power monitoring system 120 converts all measurement into common units of measurement. In an example, the light level signal detected by certain switch ports is measured in dBm, while the light level detected from the storage ports is measured in Milliwatts. The units dBm represent decibels per milliwatt. Measurements of optical power may be expressed in units of dBm. The "m" in dBm refers to the reference power, which may be ImW. A milliwatt is a unit of power equal to one thousandth of a watt. A watt is used to specify the rate at which electrical energy is dissipated, or the rate at which electromagnetic energy is radiated, absorbed, or dissipated. In the example, a measurement received in milliwatts is converted to dBm to have consistent measurement across each component for storage and analysis. Any other units of measurement provided by a component may be converted to a standard unit. When measurements are stored in a single unit of measure, direct comparison of data may be performed during an analysis without a need for further programming of unit conversions.

In block 350, the optic power monitoring system 120 analyzes aggregated logged data to detect patterns and trends. The optic power monitoring system 120 may receive the data from any number of components of the network 105. For example, in a large network, thousands of components may provide data, such as 1,000 or 10,000 components. Each component may provide data continuously or in discrete data packets. The data packets may include, for example, ten seconds or ten minutes of optic power levels. When communicating continuously, the data may be a continuous reading of the optic power level at the component.

The optic power monitoring system 120 may aggregate the data for any number of the components, such as for all 10,000 of the components. For example, the optic power monitoring system 120 may place all of the data in a database, average all of the data, list all of the data in a spreadsheet format, or save the data in any suitable format. The optic power monitoring system 120 may compare inputs from similar devices. For example, the optic power monitoring system 120 may save the inputs to servers 140 that are being used in a particular application or are from the same manufacturer. The aggregated data from these similar components may provide additional information when compared or analyzed.

The optic power monitoring system 120 analyzes the data. The analysis may be based on a set of rules or algorithms to detect patterns or trends, identify events or failures, or to create models of component behaviors.

Each location, node, component, or other subsection of the network 105 may include a number of metrics that may be used to perform the analysis. For example, a list of metrics may include inventory data for each component such as vendor, model, type, serial number, name, and geographical location. The metrics may include a present measure of light expressed in decibels per milliwatts or milliwatts. The metrics may include a fiber channel status for the host paths, a list of servers 140 connected to the SAN infrastructure, a breakdown of the SAN paths, an application ID from an inventory catalog for servers 140, a list of storage arrays 130, and a list of switches 150.

For example, the optic power monitoring system 120 may map the network 105 and note the expected optic power levels at each location of the network 105. By logging the optic power level at each location, the optic power monitoring system 120 may determine that levels are lower than expected, when the levels are trending downward, when the levels are cycling, or when the levels are displaying any other indications of a fault or a potential fault.

Based on a history of optic power levels at each component, the optic power monitoring system 120 recognizes when a pattern that leads to a fault or failure is repeating. For example, if an optic power level at a particular server 140 is experiencing short periods with no signal, and the periods of no signal are becoming more frequent, then the optic power monitoring system 120 is able to predict when a failure is likely. The prediction may be based on data from previous failures that followed a similar pattern.

In another example, the optic power monitoring system 120 identifies that an optic power level is cycling. That is, the optic power level is rising and falling throughout a given time period. The optic power monitoring system 120 is able to determine based on historic data that when optic power level cycles in this manner, a failure is likely to occur. In another example, the optic power monitoring system 120 identifies that an optic power level is drifting lower. The optic power monitoring system 120 is able to predict that the optic power level will continue to drift lower until a failure is realized. The optic power monitoring system 120 determines a threshold at which corrective actions must be taken.

In an example, the analysis may be performed using one or more machine learning algorithms hosted by the optic power monitoring system 120, such as on the optic power monitoring server 125. As described in the Machine Learning section below, the data stored by the optic power monitoring system 120 is used to train the machine learning algorithm to create predictive models of the actions, systems, locations, devices, or any other characteristic of the fiber cable, the light signals being transmitted, and the components of the network 105.

The machine learning function imports or otherwise receives the data from the optic power monitoring system 120 and the components. The data is fed into the machine learning algorithm or otherwise provided as training data to the machine learning algorithm. As described herein, the data is processed and categorized by the machine learning algorithm. For example, optic power levels, device types, and system topology is used to model the network 105 and identify potential faults. Further, the machine learning algorithm may also extract non-trivial characteristics linking the data. For example, the input data to a neural network eventually becomes weights used by equations in nodes (e.g. one or more hidden layers transforms the input data into values to which the weights are applied and adjusted according to an output value). Therefore, the neural network "learns" indescribable patterns between inputs. These unseen connections, trends, and tendencies may not alone be indicative of an imminent failure, but a pattern that is not realistically observable by human analysis may provide a basis for a need for an investigation or alteration to the network 105.

In an example, the machine learning algorithm determines relationships between optical power levels, actions of the components, and failure events. As described herein, different machine learning algorithms may be tested to determine which type of machine learning algorithm provides the most accurate predictions or results. For example, the results may be tested by comparing predicted results of applying different rule sets to historical data in which fault events or failures were identified. The machine learning algorithm may deploy the model or algorithm selected for usage in real time based on the results of the testing. The results of the usage may be fed back to the machine learning algorithm to allow for adjustments to the selected algorithm. As additional results are received from user interactions, the model may be adjusted to better fit the data and thus make more accurate predictions.

The details of the method to train the machine learning algorithm are described in greater detail in the Machine Learning section below. In the examples herein, different machine learning algorithms utilized may include, but are not limited to, support vector machines, naive Bayes, neural networks, gradient boosting machines, random forests, and an ensemble of multiple algorithms. These algorithms are discussed in greater detail below.

In block 360, the optic power monitoring system 120 creates a graphical user interface 400 with representations of the aggregated data. The graphical user interface 400 may present a dashboard providing an overview of the network 105, and/or specific details of each component of the network 105.

The graphical user interface 400 may include a unique visual representation of the light/power levels to take preventive actions or make business decisions as to the effectiveness of the devices monitored. The graphical user interface 400 may display color codes to represent ranges of conformity or non-conformity to established thresholds. The graphical user interface 400 may display customized thresholds based on performance metrics from history data. The graphical user interface 400 may display daily counts of low optic power levels to help determine the persistency of issues. This display allows a user to prioritize issues according to their persistence because persistent issues or reports of low power levels may be indicative of a looming problem. The graphical user interface 400 display of daily counts of low optic power levels helps to avoid false alarms/warnings.

The graphical user interface 400 provides a less disruptive means to troubleshoot a problem's root cause due to low optic power level. The graphical user interface 400 provides a graphical federated view of data collected from the various components and aspects of the SAN infrastructure from different vendors for each of the components. The graphical user interface 400 provides options for monitoring of data, patterns, and behaviors to predict future problems and viable solutions. The graphical user interface 400 allows a user an easy process to maintain and observe inventory data of storage arrays 130 and switches 150.

The graphical user interface 400 allows a user to monitor components from multiple different vendors in a consistent, uniform format. The different types of components may be displayed together on a single graphical user interface 400.

Examples of variations of the graphical user interface 400 are described below in FIG. 4-FIG. 7.

In block 370, the optic power monitoring system 120 recommends to a technician or user to troubleshoot a component or a fiber cable. Based on a determination from the analysis that a power level input is indicative of a failure or a likely failure, the optic power monitoring system 120 communicates a notification to a user via the graphical user interface 400 or any other suitable notification technology, such as a text or an email. In the example, when the analysis indicates that an optic power level is cycling, dropping, or providing any other indication of failure, the optic power monitoring system 120 may display the fault on the graphical user interface 400 in red to indicate the failure. The display may be on the dashboard of the graphical user interface 400 to provide the notice to the user in a location that is likely to be seen.

The recommendation may be based on the optic power level actually being in a fault condition, such as being below a threshold. In another example, the recommendation may be based on a subtle inference recognized by an algorithm, such as the machine learning algorithm, that indicates that a failure may be likely or imminent, as described herein. Any other basis for the recommendation may be used.

Figure 4:
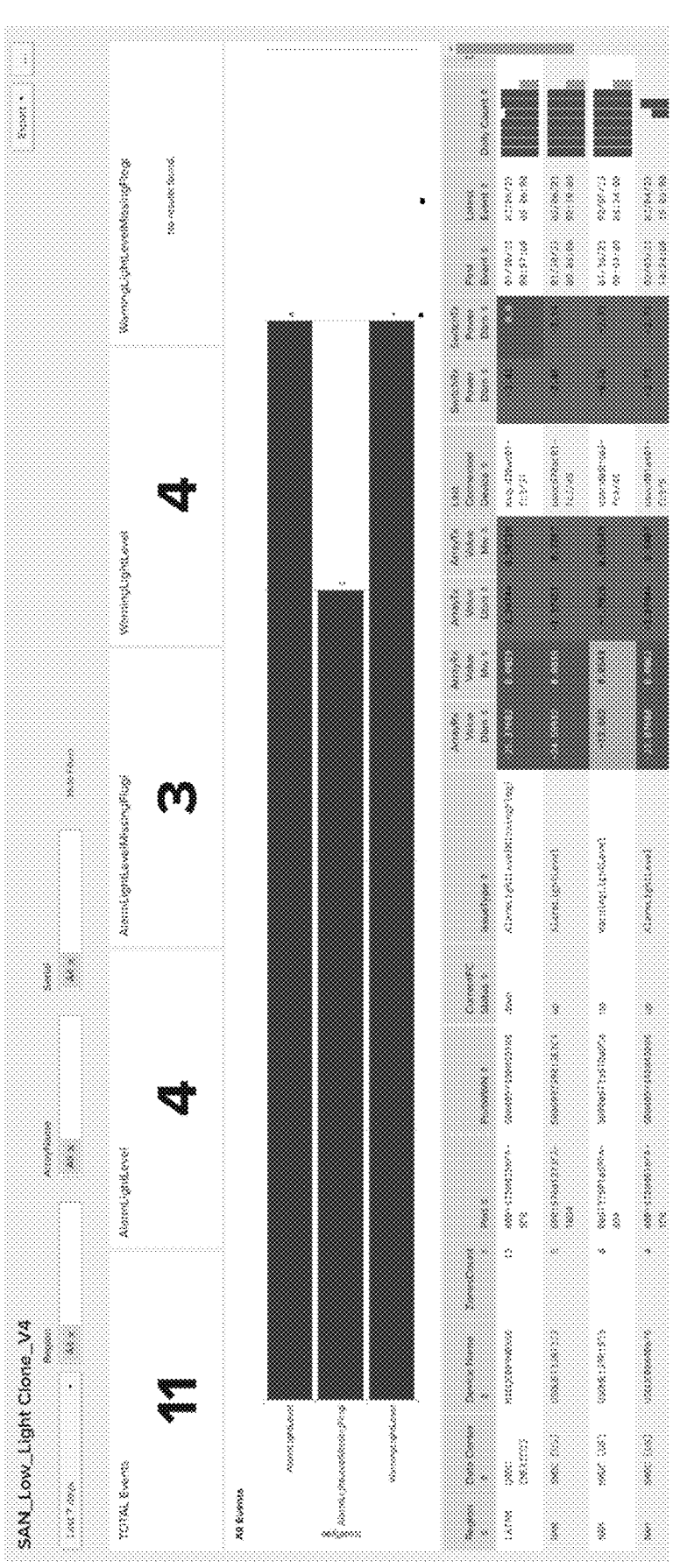
FIG. 4 is an example graphical user interface depicting a dashboard of the network.

In FIG. 4, an overview system is displayed on a dashboard of the graphical user interface 400. Specific features of the dashboard are described in greater detail in FIG. 5-FIG. 9.

Figure 5:
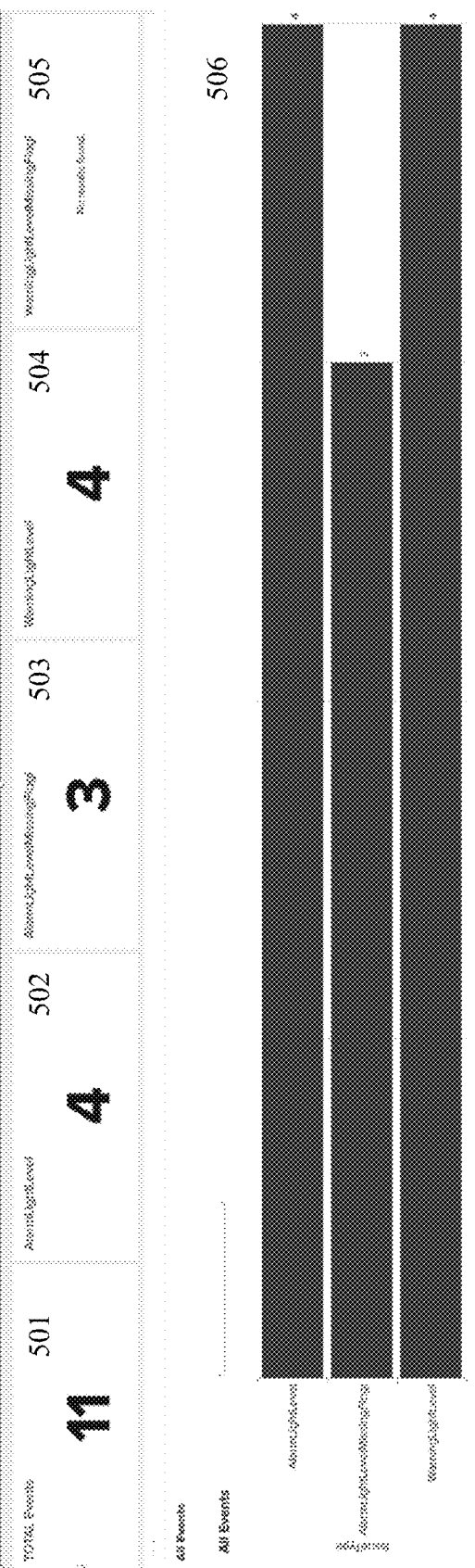
FIG. 5 is an example graphical user interface depicting fiber cable power events.

FIG. 5 is an example graphical user interface 500 depicting fiber cable power events. The graphical user interface 500 includes a numerical representation of Total Events 501, Alarm Light Level 502, Alarm Light Level Missing Flogi 503, Warning Light Level 504, and Warning Light Level Missing Flogi 505. Three of the event totals are displayed in a bar graph 506. The bar graph 506 provides a display that is easy for a user to view and assess to allow the user to determine the state of the network 105. Any other type of fault or potential fault may be displayed in the graphical user interface 500. For example, events such as power drift, power cycling, or power spikes may be displayed.

Figure 6:
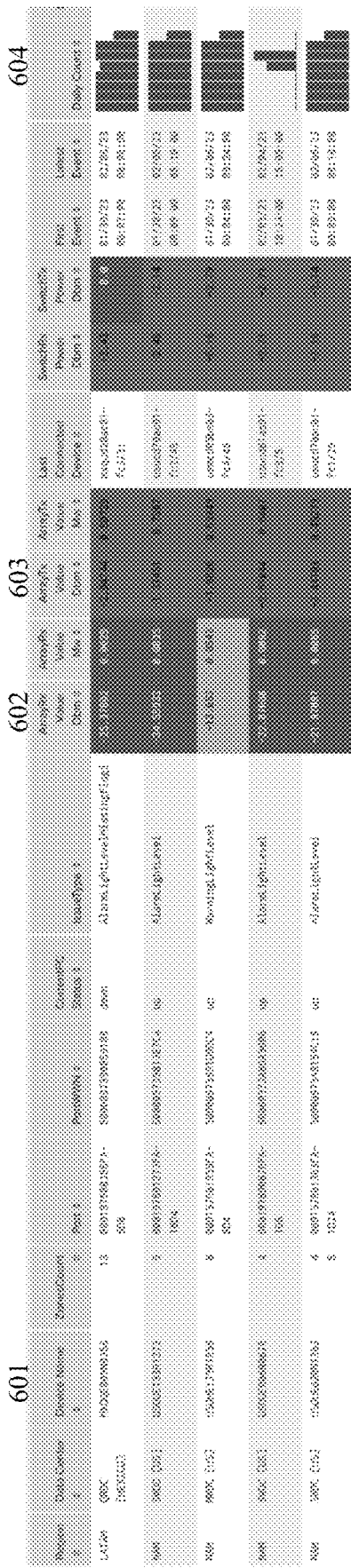
FIG. 6 is an example graphical user interface depicting fiber cable power statuses.

FIG. 6 is an example graphical user interface 600 depicting fiber cable power statuses. The graphical user interface 600 is displaying details of a status of five different devices. The device names 601 are displayed for identification. An indication of the optic power level of signals being received 602 by the device 601 and an indication of the optic power level of signals being transmitted 603 are displayed. The receiving signal level 602 is displayed in red to indicate that the device 601 input is in an alarm state. The transmitting signal level 603 is displayed in green to indicate that the device 601 output is not in an alarm state. A total number of daily events 604 is displayed to allow a user a visual indication of the number of events occurring on this day compared to previous days.

Other data is displayed on graphical user interface 600, such as the region of the device, the port used, the last connected device, the type of alarm issue, the date and time of the last event. Any other suitable display may be presented on the graphical user interface 600.

Figure 7:
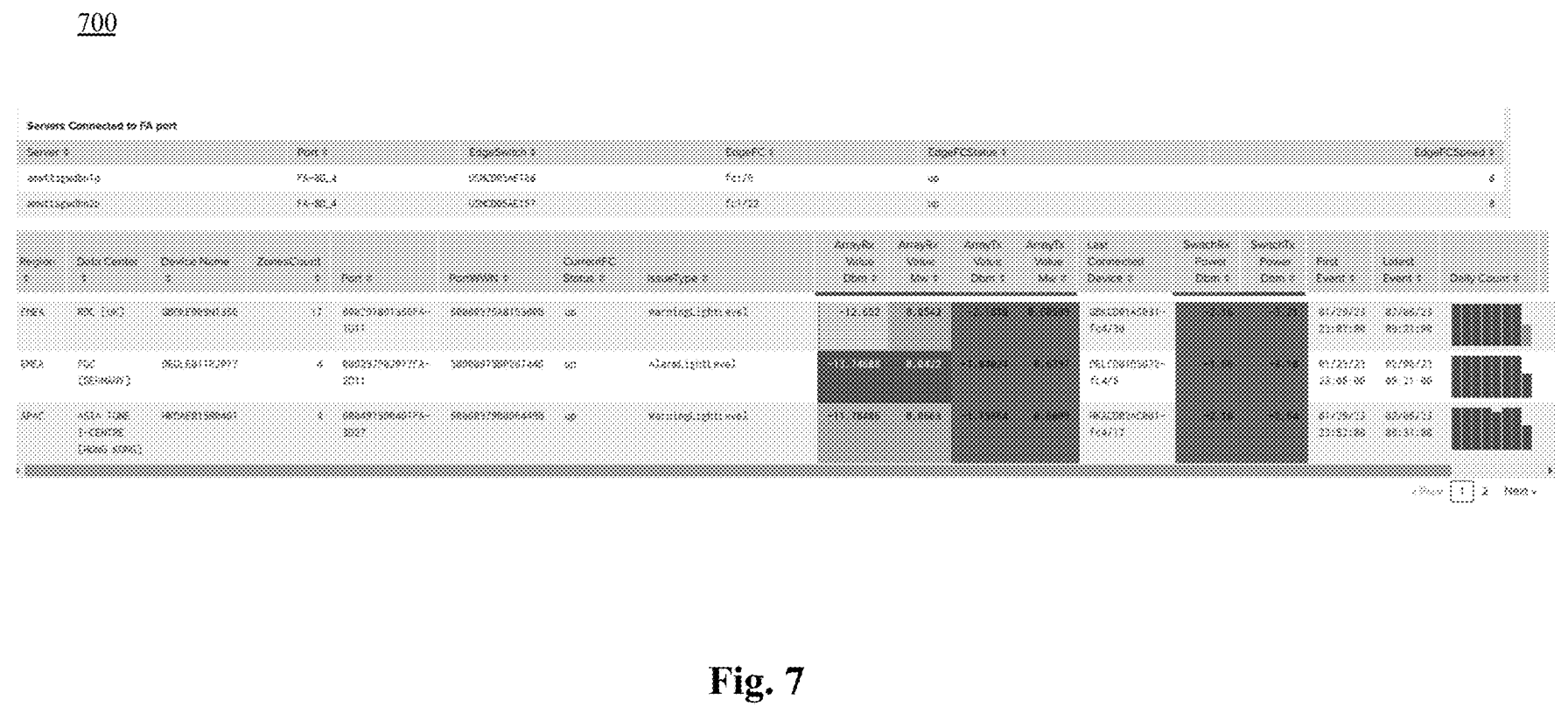

FIG. 7 is an example graphical user interface 700 depicting fiber cable power statuses. The graphical user interface 700 allows a user to specify the data in the display. For example, if a user desires to view only the servers connected to the network 105, the display appears as in FIG. 7. The status of the servers is displayed using a format as described with respect to FIG. 6, except only the servers are displayed.

Figure 8A:
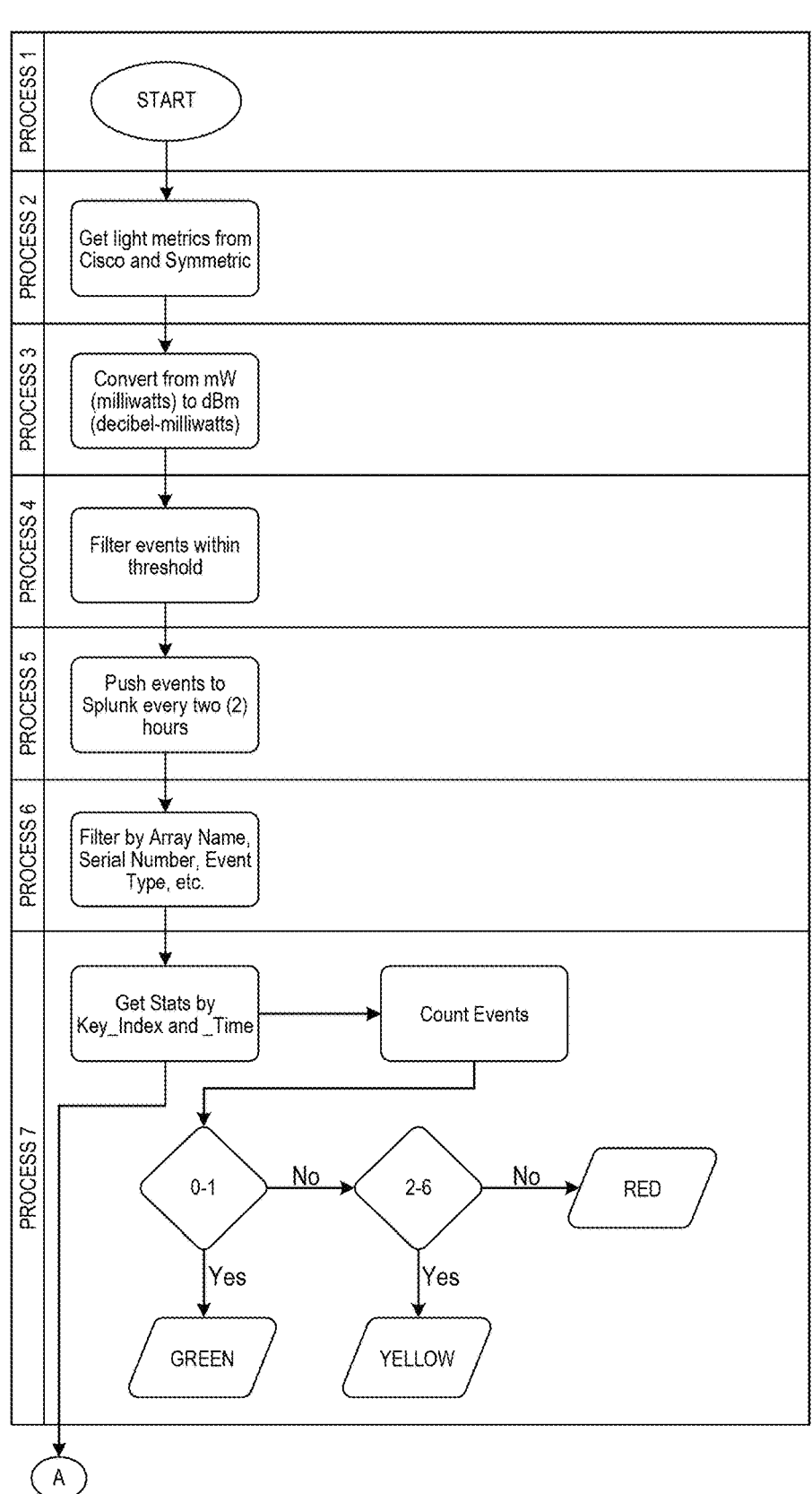
FIGS. 8a and 8b are example flow diagrams depicting a method to determine display options.
Figure 8B:
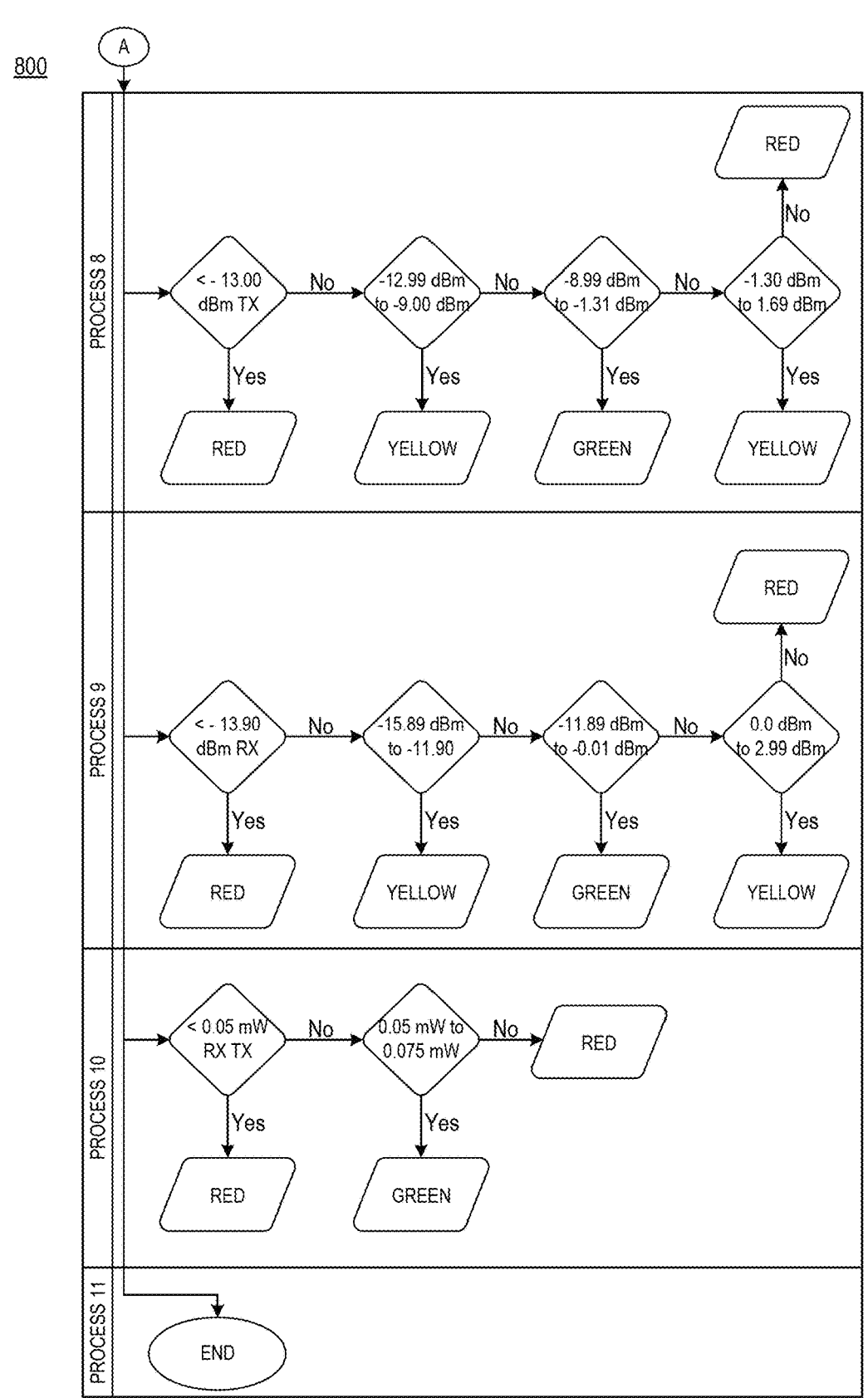

FIGS. 8a and 8b are example flow diagrams depicting a method to determine display options. The flow chart 800 represents an example logic process to determine whether input data describes an instance of faults in the measured optic power.

In process 1, the method starts. In process 2, the optic power monitoring system 120 gets light metrics from one or more of the network components, such as the storage array system 130 or the fiber channel switch 150. In process 3, the optic power monitoring system 120 converts from milliwatts ("mW") to decibel-milliwatts ("dBm"). Process 2 and process 3 may be performed as described in the method 300 of FIG. 3.

In process 4, the optic power monitoring system 120 filters events with a threshold. Events that are above or below a threshold, or are between two thresholds, are filtered such that different actions can be taken with the data. In process 5, the optic power monitoring system 120 pushes events to a web interface, such as the graphical user interface 600, every two hours. Any suitable amount of time for data to be pushed to the graphical user interface 600 may be used, as described herein.

In process 6, the optic power monitoring system 120 filters by array name, serial number, event type, or other identifiers. As described in the method 300 in FIG. 3, the optic power monitoring system 120 captures data from each component in the network and sorts the data to a storage location for that component or for the identified type of data.

In process 7, the optic power monitoring system 120 determines a color for the graphical user interface 600 to display for event totals. The optic power monitoring system 120 determines the statistics for the process, such as the key index and the time that has elapsed. The optic power monitoring system 120 counts the events that have occurred since the time period began. In examples, the time period is the previous 24 hours or the previous week. If the counted events total from 0-1, then the display is instructed to indicate GREEN. If the counted events total from 2-6, then the display is instructed to indicate YELLOW. If the counted events total a number greater than 6, then the display is instructed to indicate RED. Any suitable number of events may be used as the scale to indicate a color. For example, in a very large network with millions of nodes or users, then the optic power monitoring system 120 may indicate RED only when the total is over 100 or 1000 events.

In process 8, the optic power monitoring system 120 determines a color for the graphical user interface 600 to display for optic power levels being transmitted. The optic power monitoring system 120 logs the communicated measurements of optic power as the measurements are received. If the communicated measurements are in a particular range, then a color is assigned to the display on the graphical user interface 600. In the example, when the communicated power level is below −13.00 dBm, then the display is instructed to indicate RED. If the communicated power level is between −12.99 and −9.00 dBm, then the display is instructed to indicate YELLOW. If the received power level is between −8.99 and −1.31 dBm, then the display is instructed to indicate GREEN. If the received power level is between−1.30 and 1.69 dBm, then the display is instructed to indicate YELLOW. If the communicated power level is greater than 1.69 dBm, then the display is instructed to indicate RED. Any suitable optical power level may be used as the scale to indicate a color.

In process 9, the optic power monitoring system 120 determines a color for the graphical user interface 600 to display for optic power levels being received by a component. In the example, when the communicated power level is below−15.90 dBm, then the display is instructed to indicate RED. If the communicated power level is between −15.89 and −11.90 dBm, then the display is instructed to indicate YELLOW. If the communicated power level is between −11.89 and −0.01 dBm, then the display is instructed to indicate GREEN. If the communicated power level is between 0.0 and 2.99 dBm, then the display is instructed to indicate YELLOW. If the communicated power level is greater than 2.99 dBm, then the display is instructed to indicate RED. Any suitable optical power level may be used as the scale to indicate a color.

In process 10, the optic power monitoring system 120 determines a color for the graphical user interface 600 to display for optic power levels being transmitted and received by a component in mW. In the example, when the communicated power level is below 0.05 mW, then the display is instructed to indicate RED. If the communicated power level is between 0.05 and 0.075 mW, then the display is instructed to indicate GREEN. If the communicated power level is greater than 0.075 mW, then the display is instructed to indicate RED. Any suitable optical power level may be used as the scale to indicate a color.

In process 11, the method 800 ends.

Machine Learning

Machine learning is a field of study within artificial intelligence that allows computers to learn functional relationships between inputs and outputs without being explicitly programmed.

The term "Artificial Intelligence" refers to a quantitative method, system, or approach ("techniques") that emulates human intelligence via computer programs. These can be used to make estimates, predictions, recommendations, or decisions in manners that go beyond classical, statistical, mathematical, econometric, or financial approaches.

Machine learning is the subset of AI that derives representations or inferences from data without explicitly programming every parameter representation or computer step (for example, Random Forest or Artificial Neural Network based algorithm approaches). In contrast, AI techniques that are not members of the machine learning subset include techniques such as fuzzy logic, complex dependency parsing techniques for natural language processing.

Machine learning involves a module comprising algorithms that may learn from existing data by analyzing, categorizing, or identifying the data. Such machine-learning algorithms operate by first constructing a model from training data to make predictions or decisions expressed as outputs. In example embodiments, the training data includes data for one or more identified features and one or more outcomes, for example using optic power levels for components of the network 105 to identify that a failure is likely. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression is highly dependent on choosing informative, discriminating, and independent features. Features may comprise numerical data, categorical data, time-series data, strings, graphs, or images.

In general, there are two categories of machine learning problems: classification problems and regression problems. Classification problems, also referred to as categorization problems, aim at classifying items into discrete category values. Training data teaches the classifying algorithm how to classify. In example embodiments, features to be categorized may include interaction data, which can be provided to the classifying machine learning algorithm and then placed into categories of, for example, interactions with provider X, requesting data type Y, from user computing device Z, at geolocation A, or using application B. Regression algorithms aim at quantifying and correlating one or more features. Training data teaches the regression algorithm how to correlate the one or more features into a quantifiable value.

Embedding

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, features such as geolocation can be mapped to vectors implemented in embedding methods. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, the methods herein are developed to identify meaningful portions of the vector and extract semantic meanings between that space.

Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use. In one aspect, the training data used to teach the machine learning module can comprise input data such as optic power levels for components of the network 105.

Unsupervised and Supervised Learning

In an example embodiment, unsupervised learning is implemented. Unsupervised learning can involve providing all or a portion of unlabeled training data to a machine learning module. The machine learning module can then determine one or more outputs implicitly based on the provided unlabeled training data. In an example embodiment, supervised learning is implemented. Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

Semi-Supervised and Reinforcement Learning

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value and the machine learning module is developed to maximize the numerical value of the reward signal. In addition, reinforcement learning can adopt a value function that provides a numerical value representing an expected total of the numerical values provided by the reward signal over time.

Transfer Learning

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pre-trained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

Incremental and Curriculum Learning

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

Learning to Learn

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

Contrastive Learning

In example embodiment, contrastive learning is implemented. Contrastive learning is a self-supervised model of learning in which training data is unlabeled is considered as a form of learning in-between supervised and unsupervised learning. This method learns by contrastive loss, which separates unrelated (i.e., negative) data pairs and connects related (i.e., positive) data pairs. For example, to create positive and negative data pairs, more than one view of a datapoint, such as rotating an image or using a different time-point of a video, is used as input. Positive and negative pairs are learned by solving dictionary look-up problem. The two views are separated into query and key of a dictionary. A query has a positive match to a key and negative match to all other keys. The machine learning module then learns by connecting queries to their keys and separating queries from their non-keys. A loss function, such as those described herein, is used to minimize the distance between positive data pairs (e.g., a query to its key) while maximizing the distance between negative data points. Sec e.g., Tian, Yonglong, et al. "What makes for good views for contrastive learning?" Advances in Neural Information Processing Systems 33 (2020): 6827-6839.

Pre-Trained Learning

In example embodiments, the machine learning module is pre-trained. A pre-trained machine learning model is a model that has been previously trained to solve a similar problem. The pre-trained machine learning model is generally pre-trained with similar input data to that of the new problem. A pre-trained machine learning model further trained to solve a new problem is generally referred to as transfer learning, which is described herein. In some instances, a pre-trained machine learning model is trained on a large dataset of related information. The pre-trained model is then further trained and tuned for the new problem. Using a pre-trained machine learning module provides the advantage of building a new machine learning module with input neurons/nodes that are already familiar with the input data and are more readily refined to a particular problem. See e.g., Diamant N, et al. Patient contrastive learning: A performant, expressive, and practical approach to electrocardiogram modeling. PLOS Comput Biol. 2022 Feb. 14; 18 (2): e1009862.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, produce, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results. In example embodiments, input data can comprise optic power levels for components of the network 105, and, when provided to a trained machine learning module, results in output data such as that a failure is likely. The output can then be provided to a user to inspect a component or fiber cable.

Algorithms

Different machine-learning algorithms have been contemplated to carry out the embodiments discussed herein. For example, linear regression (LiR), logistic regression (LoR), Bayesian networks (for example, naive-bayes), random forest (RF) (including decision trees), neural networks (NN) (also known as artificial neural networks), matrix factorization, a hidden Markov model (HMM), support vector machines (SVM), K-means clustering (KMC), K-nearest neighbor (KNN), a suitable statistical machine learning algorithm, and/or a heuristic machine learning system for classifying or evaluating whether one or more rules would be useful to identify a likely failure.

The methods described herein can be implemented with more than one machine learning method. The machine learning system can use a combination of machine learning algorithms. The machine learning algorithms may be of the same type or of different types. For example, a first machine learning algorithm may be trained for a first type of result, while a second machine learning algorithm may be trained for a second type of result. In certain examples, the first type of result may be an input into the second machine learning algorithm, while in other examples, the two results are combined to produce a third result. In certain examples, the first and second types of results are both inputs into a third machine learning algorithm that produces the third result.

Linear Regression (LiR)

In one example embodiment, linear regression machine learning is implemented. LiR is typically used in machine learning to predict a result through the mathematical relationship between an independent and dependent variable. A simple linear regression model would have one independent variable (x) and one dependent variable (y). A representation of an example mathematical relationship of a simple linear regression model would be y=mx+b. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem proposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved. In example embodiments, optic power levels for components of the network 105 are used as the independent variables to train a LiR machine learning module, which, after training, is used to estimate, for example, whether a failure is likely.

Logistic Regression (LoR)

In one example embodiment, logistic regression machine learning is implemented. Logistic Regression, often considered a LiR type model, is typically used in machine learning to classify information, such as optic power levels for components of the network 105 into categories such as whether a failure is likely. LoR takes advantage of probability to predict an outcome from input data. However, what makes LoR different from a LiR is that LoR uses a more complex logistic function, for example a sigmoid function. In addition, the cost function can be a sigmoid function limited to a result between 0 and 1. For example, the sigmoid function can be of the form $f(x)=1/(1+e^{-x})$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process. In example embodiments, optic power levels for components of the network 105 are used as the independent variables to train a LoR machine learning module, which, after training, is used to estimate, for example, whether a failure is likely.

Bayesian Network

In one example embodiment, a Bayesian Network is implemented. BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node the probability of the input features resulting in the connected node is learned and forms the predictive mechanism. The nodes may comprise the same, similar or different probability functions to determine movement from one node to another. The nodes of a Bayesian network are conditionally independent of its non-descendants given its parents thus satisfying a local Markov property. This property affords reduced computations in larger networks by simplifying the joint distribution.

There are multiple methods to evaluate the inference, or predictability, in a BN but only two are mentioned for demonstrative purposes. The first method involves computing the joint probability of a particular assignment of values for each variable. The joint probability can be considered the product of each conditional probability and, in some instances, comprises the logarithm of that product. The second method is Markov chain Monte Carlo (MCMC), which can be implemented when the sample size is large. MCMC is a well-known class of sample distribution algorithms and will not be discussed in detail herein.

The assumption of conditional independence of variables forms the basis for Naïve Bayes classifiers. This assumption implies there is no correlation between different input features. As a result, the number of computed probabilities is significantly reduced as well as the computation of the probability normalization. While independence between features is rarely true, this assumption exchanges reduced computations for less accurate predictions, however the predictions are reasonably accurate. In example embodiments, optic power levels for components of the network 105 are mapped to the BN graph to train the BN machine learning module, which, after training, is used to estimate whether a failure is likely.

Random Forest

In one example embodiment, random forest ("RF") is implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets. In example embodiments, optic power levels for components of the network 105 are used to train the nodes of the decision trees of a RF machine learning module, which, after training, is used to estimate whether a failure is likely.

Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding under-performing nodes are then modified in the new tree to improve their accuracy. This process is performed iteratively until the accuracy of the model has reached a defined threshold or a defined limit of trees has been reached. Less accurate nodes are identified by the gradient of a loss function. Loss functions must be differentiable such as a linear or logarithmic functions. The modified node weights in the new tree are selected to minimize the gradient of the loss function. In an example embodiment, a decision tree is implemented to determine optic power levels for components of the network 105 and gradient boosting is applied to the tree to improve its ability to accurately determine whether a failure is likely.

Neural Networks

In one example embodiment, Neural Networks are implemented. NNs are a family of statistical learning models influenced by biological neural networks of the brain. NNs can be trained on a relatively-large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Similar to the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN for optic power levels for components of the network 105 is defined by a set of input neurons that can be given input data such as optic power levels for components of the network 105. The input neuron weighs and transforms the input data and passes the result to other neurons, often referred to as "hidden" neurons. This is repeated until an output neuron is activated. The activated output neuron produces a result. In example embodiments, user transaction histories and secondary user actions or data are used to train the neurons in a NN machine learning module, which, after training, is used to estimate whether a failure is likely.

Convolutional Autoencoder

In example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning. In example embodiments, the convolutional autoencoder is a variational convolutional autoencoder. In example embodiments, features from a optic power levels for components of the network 105 are used as an input signal into a CAE which reconstructs that signal into an output such as a whether a failure is likely.

Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction. In example embodiments, optic power levels for components of the network 105 are used to train the neurons of a deep learning module, which, after training, is used to estimate whether a failure is likely.

Convolutional Neural Network (CNN)

In an example embodiment, a convolutional neural network is implemented. CNNs is a class of NNs further attempting to replicate the biological neural networks, but of the animal visual cortex. CNNs process data with a grid pattern to learn spatial hierarchies of features. Wherein NNs are highly connected, sometimes fully connected, CNNs are connected such that neurons corresponding to neighboring data (e.g., pixels) are connected. This significantly reduces the number of weights and calculations each neuron must perform.

In general, input data, such as optic power levels for components of the network 105, comprises of a multidimensional vector. A CNN, typically, comprises of three layers: convolution, pooling, and fully connected. The convolution and pooling layers extract features and the fully connected layer combines the extracted features into an output, such as whether a failure is likely.

In particular, the convolutional layer comprises of multiple mathematical operations such as of linear operations, a specialized type being a convolution. The convolutional layer calculates the scalar product between the weights and the region connected to the input volume of the neurons. These computations are performed on kernels, which are reduced dimensions of the input vector. The kernels span the entirety of the input. The rectified linear unit (i.e., ReLu) applies an elementwise activation function (e.g., sigmoid function) on the kernels.

CNNs can optimized with hyperparameters. In general, there three hyperparameters are used: depth, stride, and zero-padding. Depth controls the number of neurons within a layer. Reducing the depth may increase the speed of the CNN but may also reduce the accuracy of the CNN. Stride determines the overlap of the neurons. Zero-padding controls the border padding in the input.

The pooling layer down-samples along the spatial dimensionality of the given input (i.e., convolutional layer output), reducing the number of parameters within that activation. As an example, kernels are reduced to dimensionalities of 2×2 with a stride of 2, which scales the activation map down to 25%. The fully connected layer uses inter-layer-connected neurons (i.e., neurons are only connected to neurons in other layers) to score the activations for classification and/or regression. Extracted features may become hierarchically more complex as one layer feeds its output into the next layer. See O'Shea, K.; Nash, R. An Introduction to Convolutional Neural Networks. arXiv 2015 and Yamashita, R., et al Convolutional neural networks: an overview and application in radiology. *Insights Imaging* 9, 611-629 (2018).

Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. For example, input such as is received by a RNN, which determines whether one or more rules would be useful to identify a likely failure. See Sherstinsky, Alex. "Fundamentals of recurrent neural network (RNN) and long short-term memory (LSTM) network." Physica D: Nonlinear Phenomena 404 (2020): 132306.

Long Short-Term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tanh, and RELU. Sec Zhu, Xiaodan, et al. "Long short-term memory over recursive structures." International Conference on Machine Learning. PMLR, 2015.

Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features and the second matrix Z contains the known output of the training input features. First the dot product of R and X are computed and the square mean error, as one example method, of the result is estimated. The values in R are modulated and the process is repeated in a gradient descent style approach until the error is appropriately minimized. The trained matrix R is then used in the machine learning model. In example embodiments, optic power levels for components of the network 105 are used to train the relationship matrix R in a matrix factorization machine learning module. After training, the relationship matrix R and input matrix F, which comprises vector representations of optic power levels for components of the network 105, results in the prediction matrix P comprising whether a failure is likely.

Hidden Markov Model

In example embodiments, a hidden Markov model is implemented. A HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. A HMM comprises a network of connected nodes. Traversing the network is dependent on three model parameters: start probability; state transition probabilities; and observation probability. The start probability is a variable that governs, from the input node, the most plausible consecutive state. From there each node i has a state transition probability to node j. Typically the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix Noj wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences. In example embodiments, user transaction histories and gcolocations are used to train the nodes/states of the HMM machine learning module, which, after training, is used to estimate whether one or more rules would be useful to identify a likely failure.

Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of a SVM. The dimensionality of a hyperplane depends on the number of input features. For example, a SVM with two input features will have a linear (1-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal. In example embodiments, optic power levels for components of the network 105 are used to train the linear equation or kernel function of the SVM machine learning module, which, after training, is used to estimate whether one or more rules would be useful to identify a likely failure.

K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised. In example embodiments, optic power levels for components of the network 105 are used to train the centroids of a KMC machine learning module, which, after training, is used to estimate whether a failure is likely.

K-Nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "out-voting" near neighbors of another class. In one example embodiment, k is 1 and a Markov model approach is utilized. In example embodiments, user transaction histories and geolocations are used to train a KNN machine learning module, which, after training, is used to estimate a failure is likely.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the module described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications so as to allow the applications to share and access common data.

Multimodal Translation

In an example embodiment, the machine learning module comprises multimodal translation (MT), also known as multimodal machine translation or multimodal neural machine translation. MT comprises of a machine learning module capable of receiving multiple (e.g. two or more) modalities. Typically, the multiple modalities comprise of information connected to each other.

In example embodiments, the MT may comprise of a machine learning method further described herein. In an example embodiment, the MT comprises a neural network, deep neural network, convolutional neural network, convolutional autoencoder, recurrent neural network, or an LSTM. For example, one or more microscopy imaging data comprising multiple modalities from a subject is embedded as further described herein. The embedded data is then received by the machine learning module. The machine learning module processes the embedded data (e.g. encoding and decoding) through the multiple layers of architecture then determines the corresponding the modalities comprising the input. The machine learning methods further described herein may be engineered for MT wherein the inputs described herein comprise of multiple modalities. See e.g. Sulubacak, U., Caglayan, O., Grönroos, SA. et al. Multimodal machine translation through visuals and speech. Machine Translation 34, 97-147 (2020) and Huang, Xun, et al. "Multimodal unsupervised image-to-image translation." Proceedings of the European conference on computer vision (ECCV). 2018.

The ladder diagrams, scenarios, flowcharts and block diagrams in the figures and discussed herein illustrate architecture, functionality, and operation of example embodiments and various aspects of systems, methods, and computer program products of the present invention. Each block in the flowchart or block diagrams can represent the processing of information and/or transmission of information corresponding to circuitry that can be configured to execute the logical functions of the present techniques. Each block in the flowchart or block diagrams can represent a module, segment, or portion of one or more executable instructions for implementing the specified operation or step. In example embodiments, the functions/acts in a block can occur out of the order shown in the figures and nothing requires that the operations be performed in the order illustrated. For example, two blocks shown in succession can executed concurrently or essentially concurrently. In another example, blocks can be executed in the reverse order. Furthermore, variations, modifications, substitutions, additions, or reduction in blocks and/or functions may be used with any of the ladder diagrams, scenarios, flow charts and block diagrams discussed herein, all of which are explicitly contemplated herein.

The ladder diagrams, scenarios, flow charts and block diagrams may be combined with one another, in part or in whole. Coordination will depend upon the required functionality. Each block of the block diagrams and/or flowchart illustration as well as combinations of blocks in the block diagrams and/or flowchart illustrations can be implemented by special purpose hardware-based systems that perform the aforementioned functions/acts or carry out combinations of special purpose hardware and computer instructions. Moreover, a block may represent one or more information transmissions and may correspond to information transmissions among software and/or hardware modules in the same physical device and/or hardware modules in different physical devices.

The present techniques can be implemented as a system, a method, a computer program product, digital electronic circuitry, and/or in computer hardware, firmware, software, or in combinations of them. The system may comprise distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors.

Example Computing Device

FIG. 9 depicts a block diagram of a computing machine 2000 and a module 2050 in accordance with certain examples. The computing machine 2000 may comprise, but is not limited to, remote devices, work stations, servers, computers, general purpose computers, Internet/web appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and any machine capable of executing the instructions. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The one or more embodiments of processor 2010 may be configured to execute code or instructions to perform the operations and functionality described herein, manage request flow and address mappings, and to perform calculations and generate commands. Such code or instructions could include, but is not limited to, firmware, resident software, microcode, and the like. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), tensor processing units (TPUs), a graphics processing unit ("GPU"), a field programmable gate array ("FPGA"), a programmable logic device ("PLD"), a radio-frequency integrated circuit (RFIC), a controller, a state machine, gated logic, discrete hardware components, any other processing unit, or any combination or multiplicity thereof. In example embodiments, each processor 2010 can include a reduced instruction set computer (RISC) microprocessor. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines. Processors 2010 are coupled to system memory and various other components via a system bus 2020.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random-access memory ("RAM"), static random-access memory ("SRAM"), dynamic random-access memory ("DRAM"), and synchronous dynamic random-access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 is coupled to system bus 2020 and can include a basic input/output system (BIOS), which controls certain basic functions of the processor 2010 and/or operate in conjunction with, a non-volatile storage device such as the storage media 2040.

In example embodiments, the computing device 2000 includes a graphics processing unit (GPU) 2090. Graphics processing unit 2090 is a specialized electronic circuit designed to manipulate and alter memory to accelerate the creation of images in a frame buffer intended for output to a display. In general, a graphics processing unit 2090 is efficient at manipulating computer graphics and image processing and has a highly parallel structure that makes it more effective than general-purpose CPUs for algorithms where processing of large blocks of data is done in parallel.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any electromagnetic storage device, any semiconductor storage device, any physical-based storage device, any removable and non-removable media, any other data storage device, or any combination or multiplicity thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The module 2050 may comprise one or more hardware or software elements, as well as an operating system, configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. Each of the operating system, one or more application programs, other program modules, and program data or some combination thereof, may include an implementation of a networking environment. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for coupling in operation the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, Fire Wire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including cursor control devices, touch-screens, scanners, electronic digitizers, sensors, receivers, touchpads, trackballs, cameras, microphones, alphanumeric input devices, any other pointing devices, or any combinations thereof. The I/O interface 2060 may couple the computing machine 2000 to various output devices including video displays (The computing device 2000 may further include a graphics display, for example, a plasma display panel (PDP), a light emitting diode (LED) display, a liquid crystal display (LCD), a projector, a cathode ray tube (CRT), or any other display capable of displaying graphics or video), audio generation device, printers, projectors, tactile feedback devices, automation control, robotic components, actuators, motors, fans, solenoids, valves, pumps, transmitters, signal emitters, lights, and so forth. The I/O interface 2060 may couple the computing device 2000 to various devices capable of input and out, such as a storage unit. The devices can be interconnected to the system bus 2020 via a user interface adapter, which can include, for example, a Super I/O chip integrating multiple device adapters into a single integrated circuit.

The computing machine 2000 may operate in a networked environment using logical connections through the network interface 2070 to one or more other systems or computing machines across the network 2080. The network 2080 may include a local area network ("LAN"), a wide area network ("WAN"), an intranet, an Internet, a mobile telephone network, storage area network ("SAN"), personal area network ("PAN"), a metropolitan area network ("MAN"), a wireless network ("WiFi;"), wireless access networks, a wireless local area network ("WLAN"), a virtual private network ("VPN"), a cellular or other mobile communication network, Bluetooth, near field communication ("NFC"), ultra-wideband, wired networks, telephone networks, optical networks, copper transmission cables, or combinations thereof or any other appropriate architecture or system that facilitates the communication of signals and data. The network 2080 may be packet switched, circuit switched, of any topology, and may use any communication protocol. The network 2080 may comprise routers, firewalls, switches, gateway computers and/or edge servers. Communication links within the network 2080 may involve various digital or analog communication media such as fiber optic cables, free-space optics, waveguides, electrical conductors, wireless links, antennas, radio-frequency communications, and so forth.

Information for facilitating reliable communications can be provided, for example, as packet/message sequencing information, encapsulation headers and/or footers, size/time information, and transmission verification information such as cyclic redundancy check (CRC) and/or parity check values. Communications can be made encoded/encrypted, or otherwise made secure, and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure and then decrypt/decode communications.

The processor 2010 may be connected to the other elements of the computing machine 2000 or the various peripherals discussed herein through the system bus 2020. The system bus 2020 represents one or more of any of several types of bus structures, including a memory bus or memory controller, a peripheral bus, an accelerated graphics port, and a processor or local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those ordinarily skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

A "server" may comprise a physical data processing system (for example, the computing device 2000 as shown in FIG. 3) running a server program. A physical server may or may not include a display and keyboard. A physical server may be connected, for example by a network, to other computing devices. Servers connected via a network may operate in the capacity of a server machine or a client machine in a server-client network environment, or as a peer machine in a distributed (e.g., peer-to-peer) network environment. The computing device 2000 can include clients' servers. For example, a client and server can be remote from each other and interact through a network. The relationship of client and server arises by virtue of computer programs in communication with each other, running on the respective computers.

The example systems, methods, and acts described in the examples and described in the figures presented previously are illustrative, not intended to be exhaustive, and not meant to be limiting. In alternative examples, certain acts can be performed in a different order, in parallel with one another, omitted entirely, and/or combined between different examples, and/or certain additional acts can be performed, without departing from the scope and spirit of various examples. Plural instances may implement components, operations, or structures described as a single instance. Structures and functionality that may appear as separate in example embodiments may be implemented as a combined structure or component. Similarly, structures and functionality that may appear as a single component may be implemented as separate components. Accordingly, such alternative examples are included in the scope of the following claims, which are to be accorded the broadest interpretation to encompass such alternate examples. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An optic power monitoring system, comprising:
one or more processors communicatively coupled to a storage device, wherein the one or more processors execute application code instructions that are stored in the storage device to cause the optic power monitoring system to:
provide a platform that receives data from a plurality of components in an optic network, the data comprising light measurements being transmitted or received by the plurality of components via one or more fiber optic cables;
aggregate the data from the plurality of components to generate aggregated data;
determine, by a machine learning algorithm, in real time that a fault is existing or likely to occur in at least one of the plurality of components based on a machine learning analysis of the aggregated data to identify trends or patterns in the aggregated data, wherein the machine learning algorithm uses relationships between or among optical power levels, actions of the plurality of components, and failure events;
generate a recommendation to a user to repair the fault; and
display the recommendation to the user on a graphical user interface.

2. The optic power monitoring system of claim 1, wherein the graphical user interface displays a color coded representation of a performance of each cable providing light to each component.

3. The optic power monitoring system of claim 1, further comprising creating, by the machine learning algorithm, a model of the optic network based on the aggregated data.

4. The optic power monitoring system of claim 3, wherein levels of light received in milliwatts is converted to decibels per milliwatt.

5. The optic power monitoring system of claim 1, wherein the aggregated data is comprised of one or more of optic power levels, device types, and system topology.

6. The optic power monitoring system of claim 1, wherein one or more optical power levels received is measured in decibels per milliwatt.

7. The optic power monitoring system of claim 1, wherein the application code instructions further cause the one or more processors to establish a threshold for received light measurements based on performance metrics from historical data.

8. An optic power monitoring system, comprising:
one or more processors communicatively coupled to a storage device, wherein the one or more processors execute application code instructions that are stored in the storage device to cause the optic power monitoring system to:
provide a platform that receives data from optic network components, the data comprising light measurements being transmitted or received by the optic network components via one or more fiber optic cables;
process the data from the optic network components to store the data in a single unit of measure;
log events of low optical power measured by the optic network components to generate logged events;
determine, based on the logged events, that a fault is existing or likely to occur, wherein a determination is made by a machine learning algorithm based on relationships between optical or among power levels, actions of the optic network components, and failure events;
generate a graphical user interface that displays aggregated data, faults, and potential faults to a user; and
generate for display a recommendation to repair the fault or a potential fault.

9. The optic power monitoring system of claim 8, wherein the optic network components comprise one or more of an optic cable, a storage array, a channel switch, or a server, and the optic network components are provided by a plurality of manufacturers.

10. The optic power monitoring system of claim 8, wherein the fault is a low level of light received from an optic cable at a component.

11. The optic power monitoring system of claim 8, wherein the determination based on the logged events that the fault is existing or likely to occur is determined by an artificial intelligence process.

12. The optic power monitoring system of claim 8, wherein the determination based on the logged events that the fault is existing or likely to occur is based on an analysis of the aggregated data to identify trends or patterns in the aggregated data.

13. The optic power monitoring system of claim 8, wherein each level of light received is measured in decibels per milliwatt.

14. The optic power monitoring system of claim 13, wherein levels of light are received in milliwatts and converted to decibels per milliwatt.

15. The optic power monitoring system of claim 8, wherein the graphical user interface displays a color coded representation of a performance of each cable providing light to each component.

16. The optic power monitoring system of claim 8, wherein the application code instructions further cause the one or more processors to establish a threshold for received light measurements based on performance metrics from historical data.

17. A method to monitor optic power, comprising:

providing a platform that receives data from optic network components in an optic network, the data comprising light measurements being transmitted or received by the optic network components via one or more fiber optic cables;

aggregating the data from the optic network components to generate aggregated data;

determining, by a machine learning algorithm, in real time that a fault is existing or likely to occur in at least one of the optic network components based on a machine learning analysis of the aggregated data to identify trends or patterns in the aggregated data, wherein the machine learning algorithm uses determined relationships between or among optical power levels, actions of the optic network components, and failure events;

generating a recommendation to a user to repair the fault; and generating for display the recommendation to be displayed to the user on a graphical user interface.

18. The method of claim 17, wherein the graphical user interface displays a color coded representation of a performance of each cable providing light to each component.

19. The method of claim 17, further comprising creating, by the machine learning algorithm, a model of the optic network based on the aggregated data.

\* \* \* \* \*